United States Patent
Nagase

(10) Patent No.: US 7,188,040 B2
(45) Date of Patent: Mar. 6, 2007

(54) PHYSICAL QUANTITY SENSOR WITH TRIMMING FUNCTION

(75) Inventor: Kazuyoshi Nagase, Aichi-ken (JP)

(73) Assignee: Denso Corporation, Kariya (JP)

( * ) Notice: Subject to any disclaimer, the term of this patent is extended or adjusted under 35 U.S.C. 154(b) by 21 days.

(21) Appl. No.: 11/214,051

(22) Filed: Aug. 30, 2005

(65) Prior Publication Data

US 2006/0044048 A1   Mar. 2, 2006

(30) Foreign Application Priority Data

Aug. 31, 2004   (JP) ............................. 2004-252282

(51) Int. Cl.
*G06F 19/00* (2006.01)
(52) U.S. Cl. ........................ 702/104; 702/85
(58) Field of Classification Search ................. 73/1.79, 73/1.81, 1.82, 1.83, 1.84, 1.85; 702/85, 104
See application file for complete search history.

(56) References Cited

U.S. PATENT DOCUMENTS

| | | | |
|---|---|---|---|
| 4,303,984 A | * | 12/1981 | Houvig ........................ 702/104 |
| 6,324,482 B1 | | 11/2001 | Nakagaki et al. |
| 6,374,191 B1 | * | 4/2002 | Tsuchiya et al. ............ 702/104 |
| 6,518,880 B2 | * | 2/2003 | Tanizawa ..................... 340/514 |
| 6,718,275 B2 | | 4/2004 | Nagase et al. |

FOREIGN PATENT DOCUMENTS

| | | |
|---|---|---|
| JP | 11-30530 | 2/1999 |
| JP | 2002-116051 | 4/2002 |
| JP | 2002-350256 | 12/2002 |

* cited by examiner

*Primary Examiner*—John Barlow
*Assistant Examiner*—Douglas N Washburn
(74) *Attorney, Agent, or Firm*—Posz Law Group, PLC

(57) ABSTRACT

When a voltage applied to an output terminal exceeds a power source voltage to be supplied during an ordinary operation state, a reset signal turns into L level and the operation mode of a sensor goes into a trimming operation mode. The voltage entered into the output terminal is changed in a voltage range higher that the power source voltage to input trimming data with a data signal having L or H level. The entered trimming data is temporarily held by a latch and then written into a memory in response to a write voltage applied to a power source terminal in a write mode. Then, the trimming data held by the latch or the trimming data stored in the memory can be read out as a change in the sink current of the output terminal when a read mode is set.

23 Claims, 9 Drawing Sheets

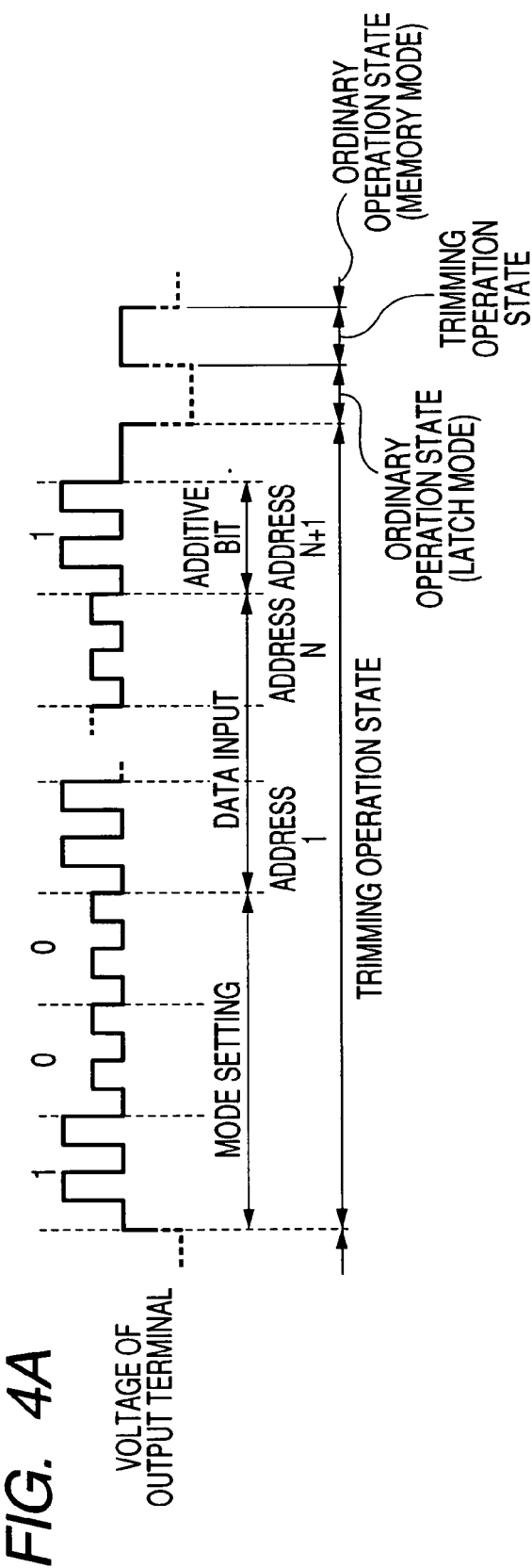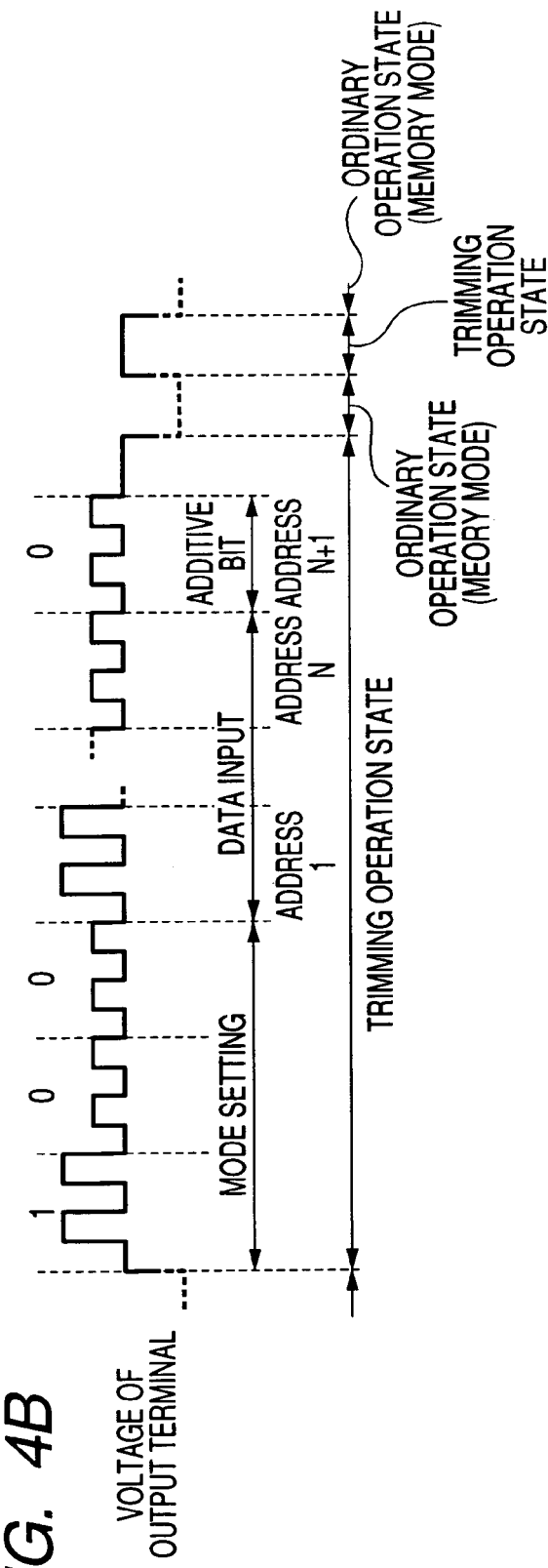

PHYSICAL QUANTITY SENSOR WITH TRIMMING FUNCTION

CROSS-REFERENCE TO RELATED APPLICATION

This application is based upon and claims the benefit of priority from earlier Japanese Patent Application No. 2004-252282 filed on Aug. 31, 2004 so that the description of which is incorporated herein by reference.

BACKGROUND OF THE INVENTION

The present invention relates to a sensor equipped with a trimming circuit which is applicable to a pressure sensor, an acceleration sensor, and other physical quantity sensors.

To downsize physical quantity sensors and reduce their manufacturing costs, it is preferable that the sensor has a smaller number of terminals used for the trimming adjustment of the physical quantity sensor. For example, the Japanese patent application Laid-open No. 11-30530(1999) corresponding to U.S. Pat. No. 6,324,482 (hereinafter, referred to as prior art document 1) discloses a sensor having an adjustment function. This sensor is arranged to operate in an adjustment mode when it receives serial transmission of an adjustment signal sent from an external signal source to its signal output terminal. This sensor requires no terminal dedicated to input of the adjustment mode signal. Furthermore, the Japanese patent application Laid-open No. 2002-350256 corresponding to U.S. Pat. No. 6,718,275 (hereinafter, referred to as prior art document 2) discloses a trimming circuit which is arranged to input a control signal to a logic circuit, has a trimming adjustment terminal provided to apply a writing signal of high voltage for writing data into a memory, and produces a signal for the trimming operation based on only the TRIM signal entered from this trimming adjustment terminal.

According to the sensor disclosed in the above-described prior art document 1, a microcomputer checks the value given via the signal output terminal from the outside at predetermined intervals, starts data reception of 1 byte in response to detection of a start bit and judges it as an erratic data when a stop bit is not correct. However, according to this arrangement, the microcomputer may frequently start data receiving actions in response to various signals, including external noise, entered into the signal output line. The processing burden of the microcomputer will increase. Furthermore, the trimming circuit disclosed in the above-described prior art document 2 requires a special terminal dedicated to the trimming adjustment and accordingly reduction in size and cost will be difficult.

SUMMARY OF THE INVENTION

In view of the above-described problems, the present invention has an object to provide a sensor capable of performing the trimming operation without using a special trimming terminal and capable of preventing malfunctions in the trimming operation against incoming noises.

In order to accomplish the above and other related objects, the present invention provides a first sensor including a sensor signal processing circuit, a data separation circuit, and trimming value control circuit. The sensor signal processing circuit of the first sensor, having a power source terminal and all output terminal, performs at least one of adjustment of a voltage supplied to a sensing element and adjustment of an output signal of the sensing element by using a trimming value, and outputs a detection signal representing the output signal of the sensing element from the output terminal. The data separation circuit of the first sensor produces a transfer signal instructing transition to a trimming operation state and separates data from a voltage signal entered into the output terminal, based on a comparison between a voltage entered into the output terminal and a predetermined reference voltage which is set beforehand to be a value within a voltage range higher than a power source voltage applied to the power source terminal in an ordinary operation state. The trimming value control circuit of the first sensor includes a holding circuit and a memory. The holding circuit temporarily holds trimming data corresponding to a trimming value determining an adjustment amount for the adjustment performed by the sensor signal processing circuit among the data separated by the data separation circuit. The memory stores trimming data held by the holding circuit. The trimming value control circuit writes trimming data held in the holding circuit into the memory by using a write voltage given to the power source terminal. The trimming value control circuit selects either the trimming data held by the holding circuit or the trimming data stored in the memory in the ordinary operation. Furthermore, the trimming value control circuit produces a trimming value corresponding to a selected trimming data and sends the trimming value to the sensor signal processing circuit.

According to the first sensor of the present invention, in the ordinary operation state performing sensor output operation, the trimming value control circuit selects the trimming data held by the holding circuit or the trimming data stored in the memory (e.g. nonvolatile memory). The trimming value control circuit produces a trimming value corresponding to the selected trimming data and outputs it to the sensor signal processing circuit. The sensor signal processing circuit executes either adjustment of the voltage supplied to the sensing element or adjustment of the output signal of the sensing element by using this trimming value. Then, the sensor signal processing circuit produces the detection signal representing the output signal of the sensing element from its output terminal.

On the other hand, when a voltage applied to the output terminal is higher than the power source voltage to be applied during the ordinary operation state, the sensor transfers to the trimming operation state based on a comparison between this input voltage and the predetermined reference voltage. The data separation circuit separates the data from the voltage signal entered from the output terminal. Then, the trimming value control circuit causes the holding circuit to hold the trimming data corresponding to the trimming value having been subjected to the above-described adjustment from the data separated by the data separation circuit. Furthermore, the trimming value control circuit causes the memory to write the trimming data being held by the holding circuit by using the write voltage given to the power source terminal.

In this manner, switching between the ordinary operation state and the trimming operation state is performed based on the voltage applied to the output terminal. As the trimming data is entered from the output terminal, it is not necessary to provide a trimming adjustment terminal. Thus, reductions in size and costs for the sensor can be realized. Furthermore, unless a voltage higher than the ordinary power source voltage is applied to the output terminal, no erroneous transition to the trimming operation state occurs. In other words, the sensor does not easily transfer to the trimming operation state even when external noises are entered. It becomes possible to prevent malfunctions with respect to the trimming operation.

According to a preferable embodiment of the present invention, the data separation circuit produces an operation state signal identifying a present operation state between the ordinary operation state and the trimming operation state, based on a comparison between the voltage entered into the output terminal and a first reference voltage. The data separation circuit produces a clock signal based on a comparison between the voltage entered into the output terminal and a second reference voltage being set to be higher than the first reference voltage. And, the data separation circuit separates a data signal based on a comparison between the voltage entered into the output terminal and a third reference voltage being set to be higher than the second reference voltage. According to this arrangement, when the voltage entered into the output terminal exceeds the first reference voltage, the operation state transfers from the ordinary operation state to the trimming operation state. Then, the second reference voltage is set to be higher than the first reference voltage, and the third reference voltage is set to be higher than the second reference voltage. Wen the voltage entered into the output terminal exceeds the second reference voltage, the data separation circuit produces the sync clock signal. And, the data separation circuit discriminates whether the data is L level or H level based on a comparison between the voltage entered into the output terminal and the third reference voltage.

According to a preferred embodiment of the present invention, the sensor further includes a power source circuit which produces a constant voltage from the voltage given to the power source terminal, and a write voltage switching circuit which selects a higher voltage between the constant voltage of the power source circuit and the voltage entered into the output terminal and outputs a selected voltage to a write voltage supply line of the memory. The trimming value control circuit writes the trimming data held by the holding circuit into the memory by using a write voltage given to the output terminal instead of using the voltage given to the power source terminal. According to this arrangement, the trimming data held by the holding circuit is written into the memory in response to the write voltage given to the output terminal, not to the power source terminal. However, the voltage applied to output terminal may decrease than the power source voltage in the ordinary operation state in accordance with the output signal of the sensing element. When the circuit arrangement uses a P-channel MOS process, the substrate potential may cause undesirable reduction though it should be inherently fixed to the maximum potential. In view of this problem, according to the above preferable arrangement of the present invention, a higher voltage is selected between the constant voltage produced from the voltage given to the power source terminal and the voltage applied to the output terminal. The selected voltage is given via the write voltage supply line to the memory. Accordingly, it becomes possible to prevent the inversion of the above-described substrate potential.

According to a preferred embodiment of the present invention, the data separated by the data separation circuit includes a mode setting data, and the sensor signal processing circuit outputs the trimming data held by the holding circuit or the trimming data stored in the memory from the output terminal when the mode setting data in the trimming operation state is a read operation mode. According to this arrangement, when the mode setting data in the trimming operation state is the read operation mode, the trimming data held by the holding circuit or the trimming data stored in the memory is produced from the output terminal and accordingly the data being presently set can be read out and confirmed.

Furthermore, to accomplish the above and other related objects, the present invention provides a second sensor, including a sensor signal processing circuit, a data separation circuit, and a trimming value control circuit. The sensor signal processing circuit of the second sensor has a power source terminal and performs at least one of adjustment of a voltage supplied to a sensing element and adjustment of an output signal of the sensing element by using a trimming value, and outputs a detection signal representing the output signal of the sensing element from the power source terminal. The data separation circuit of the second sensor produces a transfer signal instructing transition to a trimming operation state and separating data from a voltage signal entered into the power source terminal, based on a comparison between a voltage entered into the power source terminal and a predetermined reference voltage which is set beforehand to be a value within a voltage range higher than the power source voltage applied to the power source terminal in an ordinary operation state. The trimming value control circuit of the second sensor includes a holding circuit and a memory. The holding circuit temporarily holds trimming data corresponding to a trimming value determining an adjustment amount for the adjustment performed by the sensor signal processing circuit among the data separated by the data separation circuit. The memory stores trimming data held by the holding circuit. The trimming value control circuit writes trimming data held in the holding circuit into the memory by using a write voltage given to the power source terminal. The trimming value control circuit selects either the trimming data held by the holding circuit or the trimming data stored in the memory in the ordinary operation. And, the trimming value control circuit further produces a trimming value corresponding to a selected trimming data and sends the trimming value to the sensor signal processing circuit.

According to the second sensor, when a voltage applied to the power source terminal is higher than the power source voltage to be applied during the ordinary operation, the operation state of the sensor transfers to the trimming operation state based on a comparison between this input voltage and the predetermined reference voltage. The data separation circuit separates the data from the voltage signal entered into the power source terminal. Then, the trimming value control circuit causes the holding circuit to hold the trimming data corresponding to the trimming value having been subjected to the above-described adjustment from the data separated by the data separation circuit. Furthermore, the trimming value control circuit causes the memory to write the trimming data being held by the holding circuit by using the write voltage given to the power source terminal.

In the ordinary operation state, the trimming value control circuit produces the trimming value corresponding to the trimming data and sends this trimming value to the sensor signal processing circuit. The sensor signal processing circuit executes either adjustment of the voltage supplied to the sensing element or adjustment of the output signal of the sensing element by using this trimming value. According to this preferable arrangement of the present invention, it becomes possible to perform the trimming operation for a magnetic sensor or a two-line sensor having no output terminal.

According to a preferable embodiment of the second sensor, the data separation circuit produces an operation state signal identifying a present operation state between the ordinary operation state and the trimming operation state, based on a comparison between the voltage entered into the power source terminal and a first reference voltage. The data separation circuit produces a clock signal based on a comparison between the voltage entered into the power source terminal and a second reference voltage being set to be higher than the first reference voltage. And, the data separation circuit separates a data signal based on a comparison between the voltage entered into the power source terminal and a third reference voltage being set to be higher than the second reference voltage. According to this arrangement, when the voltage entered into the power source terminal exceeds the first reference voltage, the operation state of the sensor transfers from the ordinary operation state to the trimming operation state. Furthermore, the second reference voltage is set to be higher than the fist reference voltage and the third reference voltage is set to be higher than the second reference voltage. When the voltage entered into the power source terminal exceeds the second reference voltage, the data separation circuit produces the sync clock signal. And, the data separation circuit discriminates whether the data is L level or H level based on a comparison between the voltage entered into the power source terminal and the third reference voltage.

According to a preferred embodiment of the second circuit, the data separated by the data separation circuit includes a mode setting data, and the sensor signal processing circuit outputs the trimming data held by the holding circuit or the trimming data stored in the memory from the power source terminal when the mode setting data in the trimming operation state is the read operation mode. According to this arrangement, when the mode setting data in the trimming operation state is the read operation mode, the trimming data held by the holding circuit or the trimming data stored in the memory is produced from the power source and accordingly the data being presently set can be read out and confirmed.

According to a preferred embodiment of the first or second circuit, the trimming value control circuit selects either the trimming data held by the holding circuit or the trimming data stored in the memory based on a data pattern contained in a data stream separated by the data separation circuit in response to a transition of the sensor from the trimming operation state to the ordinary operation state, and produces a trimming value corresponding to a selected trimming data and outputs the trimming value to the sensor signal processing circuit, According to this arrangement, when the data pattern contained in the data stream separated from the data separation circuit is a specific pattern, it becomes possible to produce the trimming value corresponding to the trimming data held by the holding circuit, not the trimming data stored in the memory, in response to the transition from the trimming operation state to the ordinary operation state. With this arrangement, before the trimming data held by the holding circuit is finally written into the memory, it becomes possible to obtain the detection signal by using the trimming data held by the holding circuit. Thus, input of the trimming data and measurement of the detection signal using the trimming data can be repeatedly performed so as to perform the adjustment for the sensing element. The adjustment time required for the adjustment process (i.e. trimming process) can be shortened.

According to a preferred embodiment of the first or second circuit, the data separated by the data separation circuit includes a mode setting data, and the trimming value control circuit writes the trimming data held by the holding circuit into the memory when the mode setting data in the trimming operation state is a write operation mode. According to this arrangement, when the mode setting data in the trimming operation state is the write operation mode, the trimming data held by the holding circuit is written into the memory. Thus, it is not necessary to provide a special or dedicated write control terminal.

According to a preferred embodiment of the first or second circuit, the trimming value control circuit prohibits production of the trimming value based on trimming data held by the holding circuit after the trimming data held by the holding circuit is written in the memory. According to this arrangement, the trimming data held by the holding circuit is once written into the memory, selecting the trimming data held by the holding circuit is prohibited. Thus, it becomes possible to prevent the trimming data held by the holding circuit from being erroneously selected during the ordinary operation state after finishing the shipment of the sensor product.

BRIEF DESCRIPTION OF THE DRAWINGS

The above and other objects, features and advantages of the present invention will become more apparent from the following detailed description which is to be read in conjunction with the accompanying drawings, in which:

FIGS. 4A and 4B are diagrams showing waveforms of the voltage applied to an output terminal in a data input mode of trimming operation state;

DESCRIPTION OF THE PREFERRED EMBODIMENTS

Preferred embodiments of the present invention will now be explained hereinafter with reference to attached drawings.

First Embodiment

Figure 1:
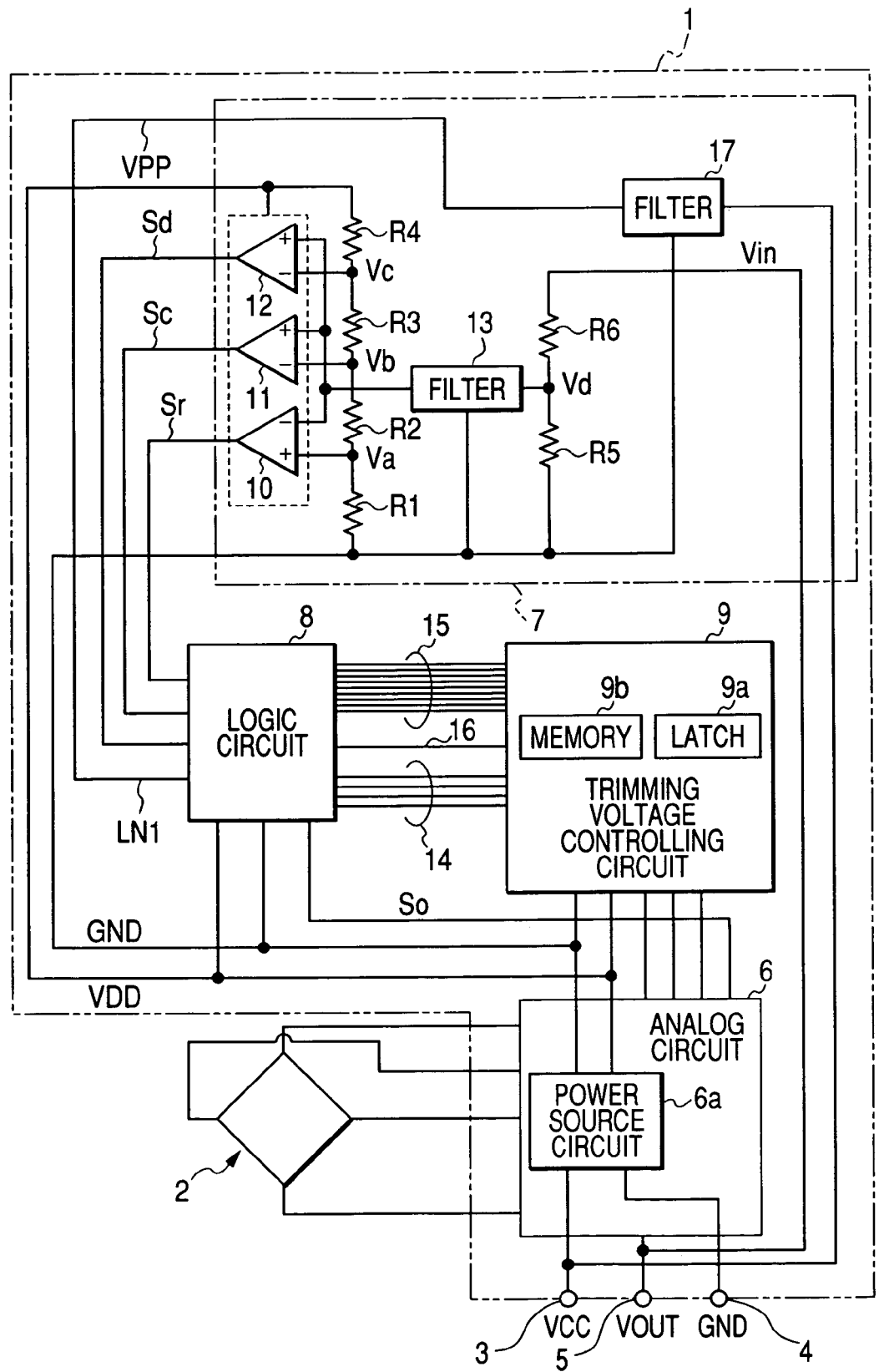
FIG. 1 is a circuit diagram showing an electric arrangement of a sensor circuit in accordance with a first embodiment of the present invention.

Hereinafter, a first embodiment of the present invention will be explained with reference to FIGS. 1 to 6. FIG. 1 shows an electric arrangement of a CMOS sensor circuit 1 incorporating a trimming circuit together with a sensing element 2. This sensor circuit 1 forms a unit for driving the sensing element 2, which is one aspect of the present invention.

Thus the sensor circuit 1 (i.e., sensing element driving unit) and the sensing element 2 forms the sensor for sensing a physical quantity.

The sensor circuit 1 is connected to a sensing element 2 which, for example, acts as a physical quantity sensor. The sensing element 2 consists of four piezoelectric elements connected in a predetermined bridge pattern. The sensor circuit 1 has an output terminal 5 which produces a sensor output having a voltage corresponding to an output signal of the sensing element 2 (corresponding to a detection signal) in an ordinary operation state.

Furthermore, the sensor circuit 1 includes a trimming circuit which performs an electric trimming operation (hereinafter, simply referred to as "trimming operation") for realizing sensitivity adjustment, offset adjustment, offset temperature characteristics adjustment of the sensing element 2. The output terminal 5 functions as a sensor output terminal in the above-described ordinary operation state on one hand and functions as an input terminal in a trimming operation state on the other hand to collect trimming data when the above-described trimming operation is performed.

The sensor circuit 1 has a pair of power source terminals 3 and 4 to receive electric power from a power source. These power source terminals 3 and 4 function as power supply terminals supplying a drive voltage VCC to the sensor circuit 1 in the ordinary operation state and also function as not only the power supply terminals of the sensor circuit 1 but also a write signal terminal to input a write voltage VPP into a memory in the trimming operation state. The sensor circuit 1 has only three terminals (i.e. input/output terminals) 3, 4, and 5 and has no trimming terminals being specially or separately provided.

The sensor circuit 1 includes an analog circuit 6, a control signal separation circuit 7, a logic circuit 8, and a trimming voltage controlling circuit 9. Respective circuits are arranged in the following manner.

The analog circuit 6 (corresponding to a sensor signal processing circuit) adjusts a voltage applied to the sensing element 2 based on a trimming voltage (corresponding to a trimming value) given from the trimming voltage controlling circuit 9 and also adjusts an output signal of the sensing element 2 based on the trimming voltage given from the trimming voltage controlling circuit 9. The analog circuit 6 outputs a detection signal corresponding to the output signal of the sensing element 2 from its output terminal 5. The trimming adjustment performed in the analog circuit 6 can assure a high-accurate sensor output produced as a result of various adjustments, such as sensitivity adjustment, offset adjustment, and offset temperature characteristics adjustment.

Furthermore, the analog circuit 6, when it receives a data output signal So from the logic circuit 8, causes a sink current of output terminal 5 to change in a binary fashion in accordance with the data stored in a memory 9b (later-described) of the trimming voltage controlling circuit 9. Thus, the analog circuit 6 can output the data stored in the memory 9b. The analog circuit 6 includes a power source circuit 6a which inputs the voltage VCC given to the power source terminal 3 and outputs a constant power source voltage VDD.

The control signal separation circuit 7 (corresponding to a data separation circuit) obtains a divided voltage Vd of a voltage Vin entered into the output terminal 5 and compares the divided voltage Vd with a plurality of reference voltages Va, Vb, and Vc (corresponding to first, second, and third reference voltages) in the trimming operation state. The control signal separation circuit 7 separates a reset signal Sr (corresponding to a transfer signal indicating transition to the trimming operation state, and an operation state signal), a clock signal Sc, and a data signal Sd from the entered voltage Vin based on the comparison result and outputs these separated signals Sr, Sc and Sd to the logic circuit 8. The reference voltages Va, Vb, and Vc are produced by dividing the constant voltage VDD supplied form the power source circuit 6a by using a serial circuit consisting of four resistors R1 to R4. The reference voltage Va, i.e. an electric potential at a joint of resistors R1 and R2, is entered into a noninverting input terminal of comparator 10. The reference voltage Vb, i.e. an electric potential at a joint of resistors R2 and R3, is entered into an inverting input terminal of comparator 11. The reference voltage Vc, i.e. an electric potential at a joint of resistors R2 and R3, is entered into an inverting input terminal of comparator 12.

Two resistors R5 and R6 are serially connected between the output terminal 5 and a ground line. A division point of the resistors R5 and R6 is connected commonly via a filter 13 to an inverting input terminal of comparator 10, a noninverting input terminal of comparator 11, and a noninverting input terminal of comparator 12. The comparators 10, 11, and 12 respectively operate under the constant voltage VDD supplied from the power source circuit 6a.

The logic circuit 8 acts as interface between the control signal separation circuit 7 and the trimming voltage controlling circuit 9. More specifically, the logic circuit 8 obtains a mode data (corresponding to a mode setting data), a trimming data, and additive data from the data signal Sd by using the clock signal Sc as a sync clock. The circuit 8 produces a mode control signal based on the mode data, the additive data, and the reset signal Sr. The mode control signal is sent via a control bus 14 to the trilling voltage controlling circuit 9.

Furthermore, when the logic circuit 8 obtains the trimming data, the logic circuit 8 outputs an address via an address bus 15 to the trimming voltage controlling circuit 9. Furthermore, the logic circuit 8 outputs the trimming data via the data bus 16 to the trimming voltage controlling circuit 9. Thus, the trimming data is stored in a designated area of the memory of the trimming voltage controlling circuit 9. Furthermore, data exchange is performed between the logic circuit 8 and the trimming voltage controlling circuit 9. The logic circuit 8 receives the trimming data from the trimming voltage controlling circuit 9 which is stored in the memory 9b (later-described), and outputs the received trimming data as a data output signal So to the analog circuit 6.

The trimming voltage controlling circuit 9 (corresponding to a trimming value control circuit) stores the trimming data sent from the logic circuit 8, and generates a trimming voltage (i.e. trimming value) for the trimming operation based on the stored trimming data. More specifically, the trimming voltage controlling circuit 9 includes an address decoder, an input/output controller, a latch 9a (corresponding to a holding circuit), a memory 9b consisting of EPROM (i.e. nonvolatile memory), and a D/A converter. It is, however, preferable to add an error correcting circuit for correcting errors contained in the memory 9b.

In the trimming operation state, the trimming data sent from the logic circuit 8 is first held by the latch 9a, Then, the data held by the latch 9a is written into the memory 9b when a write mode (corresponding to a write operation mode) is set. In this case, the write voltage VPP is given to the trimming voltage controlling circuit 9 from the power source terminal 3 via the filter 17, the write voltage supply line LN1, and the logic circuit 8.

Furthermore, the trimming voltage controlling circuit 9 selects either the trimming data held by the latch 9a or the trimming data stored in the memory 9b based on the above-described additive data. Then, the trimming voltage controlling circuit 9 produces a trimming voltage (i.e. trimming value) based on the trimming data and outputs the rimming voltage to the analog circuit 6. Furthermore, when a read mode (corresponding to a read operation mode) is set, the trimming data held by the latch 9a or the trimming data stored in the memory 9b is sent to the logic circuit 8.

Figure 2:
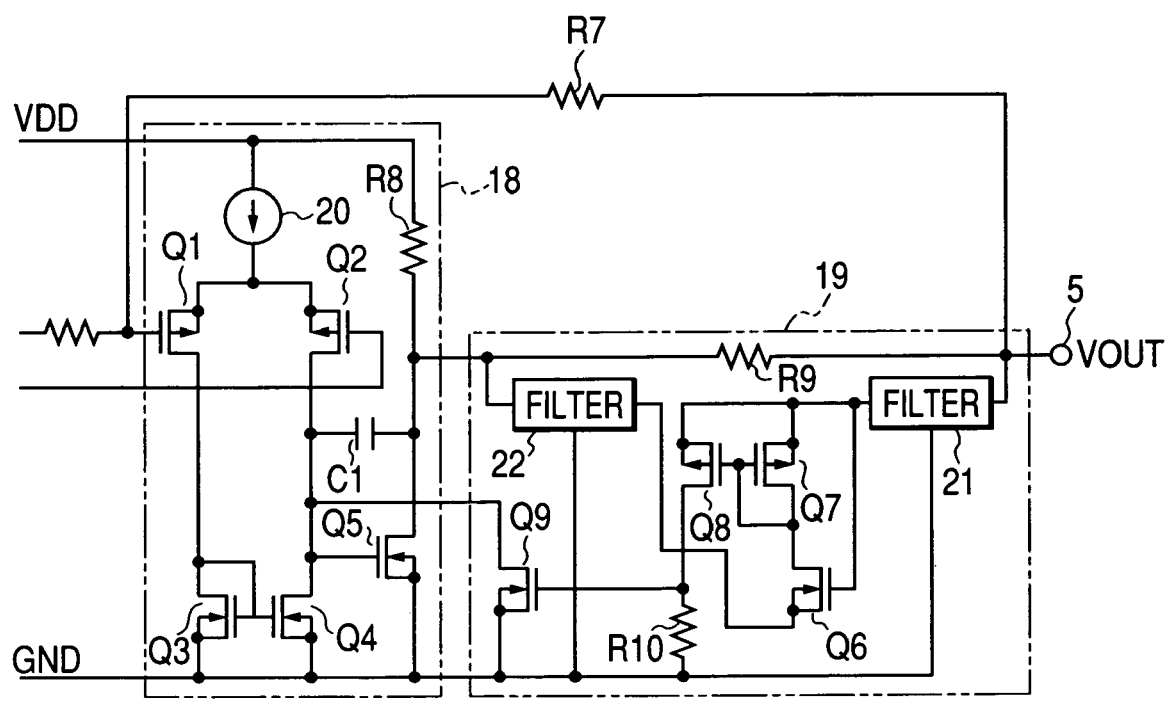
FIG. 2 is a circuit diagram showing a detailed arrangement of an output stage of an analog circuit.

As an external voltage is applied to the output terminal 5 in the trimming operation state, a current limiter is added to an output stage of analog circuit 6 to limit the flowing-in current. FIG. 2 shows a detailed circuit arrangement of the output stage of analog circuit 6. A current limiter 19 is connected between an output terminal of operational amplifier 18 and the output terminal 5 of sensor circuit 1. A resistor R7 is used to arrange an inverting amplifier circuit.

The operational amplifier 18 consists of five transistors Q1 to Q5, a constant current circuit 20, a resistor R8, and a phase compensating capacitor C1. The current limiter 19 consists of four transistors Q6 to Q9, two filters 21 and 22, and two resistors R9 and R10. The resistor R9 is a current detecting resistor. In response to an increase in the current flowing into the transistor Q5 via the resistor R9 from the output terminal 5, the voltage applied between both terminals of resistor R9 exceeds a threshold voltage Vt of transistor Q6 and the transistor Q6 turns on. The current flows across the resistor R10 via a current-mirror circuit consisting of transistors Q7 and Q8. As a result, the transistor Q9 turns on and a gate potential of transistor Q5 decreases. Thus, a restricted current flows into the output terminal 5 so that the voltage applied between both terminals of resistor R9 is equalized with the threshold voltage Vt of transistor Q6.

The filters 13, 17, 21, and 22 shown in FIGS. 1 and 2 are arranged by RC filters, Zener diodes, or the like so that they can contribute to eliminate any malfunctions and damages caused by external noises. These filters 13, 17, 21, and 22 can be omitted if unnecessary.

The trimming operation of this embodiment is performed in the following manner.

As described above, the adjustment process (i.e. trimming process) for a sensor device includes adjustment of the voltage applied to the sensing element 2 or adjustment of the output signal of sensing element 2 so as to adjust the sensitivity of sensing element 2. In this trimming process, an external circuit 23 shown in FIGS. 3B and 3C is connected to the power source terminals 3 and 4 and the output terminal 5 of the sensor circuit 1.

The external circuit 23 includes a voltage source 24 to be connected between power source terminals 3 and 4, and a voltmeter 25 to be connected between the output terminal 5 and the power source terminal 4, Furthermore, a switch 26, an ammeter 27, and a trimming signal source 28 are serially connected between the output terminal 5 and the power source terminal 4. The voltage source 24 has the capability of supplying the drive voltage VCC of the sensor circuit 1 or the write voltage VPP for the memory 9b. Furthermore, when the sensor circuit 1 is set to the read mode, the ammeter 27 detects the current flowing into the output terminal 5 and outputs a data corresponding to the detected flowing-in current. Furthermore, the trimming signal source 28 applies a trimming signal, as a voltage signal representing the data, to the output terminal 5 in the trimming operation state. As the current limiter is provided in the output stage of analog circuit 6, the output current of trimming signal source 28 is limited and does not exceed its current output capability (for example, several mA).

Figure 3A:
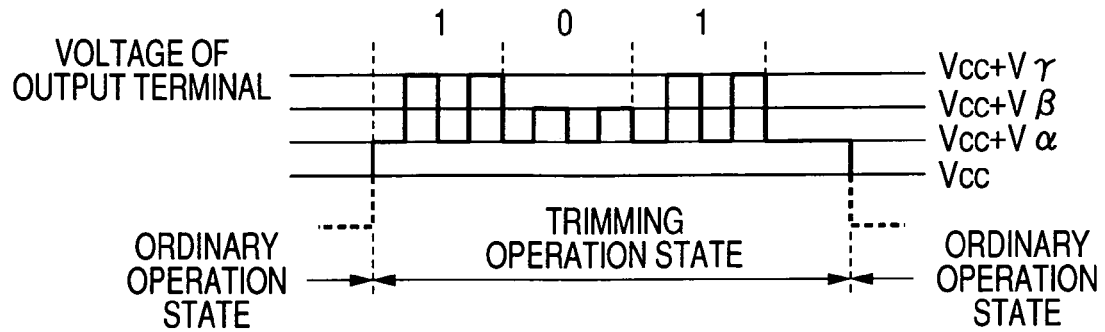
FIG. 3A is a diagram showing a voltage waveform at an output terminal in a trimming operation state.
Figure 3B:
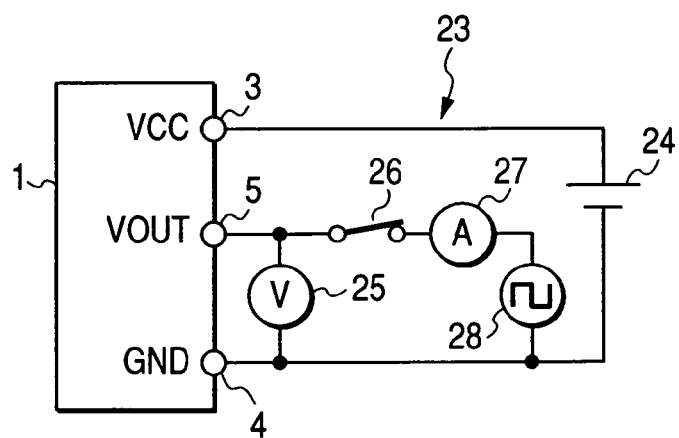
FIG. 3B is a circuit diagram showing collection of the sensor circuit and an external circuit when a trimming signal is applied.
Figure 3C:
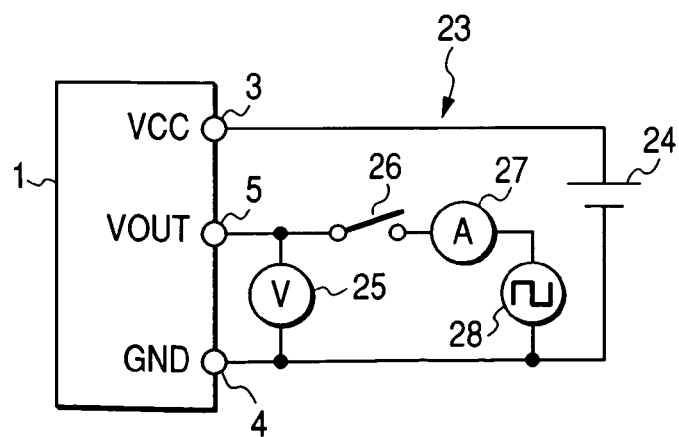
FIG. 3C is a circuit diagram showing connection of the sensor circuit and an external circuit when a sensor circuit output voltage is measured.

FIG. 3A partially shows a waveform of the voltage applied to the output terminal 5 from the trimming signal source 28 in the trimming operation state. This voltage has three voltage levels VCC+Vα, VCC+Vβ, and VCC+Vγ (Vα<Vβ<Vγ) that are respectively higher than the drive voltage VCC applied to the power source terminal 3. When these voltages are applied, the divided voltages Vd (VCC+Vα), Vd (VCC+Vβ), and Vd (VCC+Vγ) and the reference voltages Va, Vb, and Vc satisfy the following relationships.

$$Vd(VCC) < Va < Vd(VCC+V\alpha)$$

$$Vd(VCC+V\alpha) < Vb < Vd(VCC+V\beta)$$

$$Vd(VCC+V\beta) < Vc < Vd(VCC+V\gamma)$$

When the switch 26 of external circuit 23 is closed, the voltage VCC+Vα is applied to the output terminal 5. The reset signal Sr becomes an L level (0 V). In response to the reset signal Sr of L level, the sensor circuit 1 transfers from the ordinary operation state to the trimming operation state. In FIG. 3A, L(0) level data corresponds to the state where the voltage VCC+Vβ is applied to the output terminal 5 and H(1) level data corresponds to the state where the VCC+Vγ is applied to the output terminal 5. The voltage VCC+Vβ corresponding to the L level data and the voltage VCC+Vγ corresponding to the H level data are both higher than the voltage VCC+Vα. Therefore, the logic circuit 8 of sensor circuit 1 can read the data signal Sd in synchronism with the clock signal 5c.

In the trimming process, the switch 26 is first closed to connect the trimming signal source 28 to the sensor circuit 1, thereby causing the sensor circuit 1 to transfer into the trimming operation state. Meanwhile, a mode data representing the data input mode and the trimming data are given from the trimming signal source 28 to the output terminal 5. FIGS. 4A and 4B show waveforms of the voltage applied to the output terminal 5 in this case, In FIGS. 4A and 4B, a mode data "100" of the data input mode is first given to the output terminal 5. Then, the trimming data are given successively to the output terminal 5 in accordance with storing addresses 1, 2, - - - , N of the trimming data stored into the memory 9b. Finally, the additive bit is given to the output terminal 5. The trimming data entered into the sensor circuit 1 are held by the latch 9a of trimming voltage controlling circuit 9.

The additive bit is necessary to set the operation mode of the sensor circuit 1 after the switch 26 is opened to disconnect the trimming signal source 28 from the sensor circuit 1.

More specifically, in a case that the additive bit is set to "1" as shown in FIG. 4A, the trimming voltage controlling circuit 9 selects the trimming data held by the latch 9a when the switch 26 is opened to cause the sensor circuit 1 to transfer from the trimming operation state to the ordinary operation state. Then, the trimming voltage controlling circuit 9 outputs a trimming voltage based on the selected trimming data to the analog circuit 6. Hereinafter, this mode is referred to as "latch mode." The analog circuit 6 performs the sensor output operation based on the trimming voltage supplied from the trimming voltage controlling circuit 9.

On the other hand, in a case that the additive bit is set to "0" as shown in FIG. 4B, the trimming voltage controlling circuit 9 selects the trimming data stored in the memory 9b when the switch 26 is opened to cause the sensor circuit 1 to transfer from the trimming operation state to the ordinary operation state. Then, the trimming voltage controlling circuit 9 outputs a trimming voltage based on the selected trimming data to the analog circuit 6. Hereinafter, this mode is referred to as "memory mode." The analog circuit 6 performs the sensor output operation based on the trimming voltage supplied from the trimming voltage controlling circuit 9.

The rimming process, ordinarily, follows the procedure shown in FIG. 4A. More specifically, the trimming data is given in the data input mode of the trimming operation state. Then, in the latch mode of the ordinary operation state, the voltmeter 25 of external circuit 23 measures a sensor output using the trimming data of the latch 9a. When this measurement result is out of a predetermined adjustment range, the switch 26 is again closed to return the sensor circuit 1 back to the trimming operation state. A new trimming data corrected according to the data input mode is given to the output terminal 5. After the switch 26 is closed to let the sensor circuit 1 once transfer into the trimming operation state, the sensor circuit 1 automatically returns to the memory mode when the switch 26 is opened to return the sensor circuit 1 to the ordinary operation state.

Figure 5:
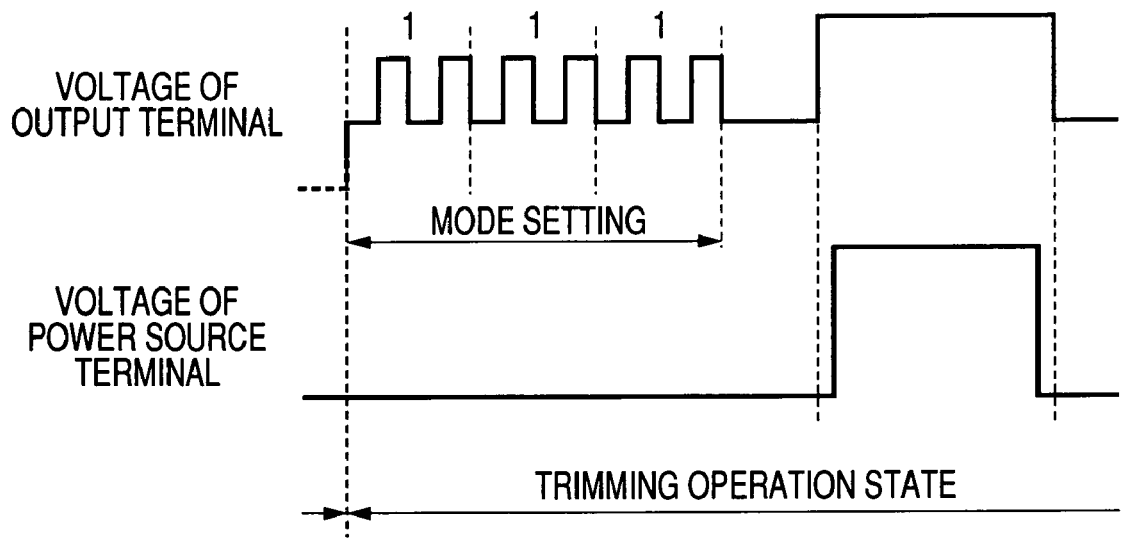
FIG. 5 is a diagram showing a waveform of the voltage applied to the output terminal during a write operation together with a waveform of the voltage applied to a power source terminal.

When the above-described measurement result is within a predetermined adjustment range, the trimming data held by the latch 9a is written into the memory 9b. FIG. 5 shows a waveform of the voltage applied to the output terminal 5 during the write operation together with a waveform of the voltage applied to the power source terminal 3. In FIG. 5, a mode data "111" of the write mode is given to the output terminal 5 from the trimming signal source 28; Then, the write voltage VPP is given from the voltage source 24 to the power source terminal 3 to write the data into the memory 9b.

During the period of time for giving the write voltage VPP (including margins being set before and after this period), the voltage corresponding to "1" must be continuously given to the output terminal 5. In this case, a voltage higher than VCC+Vγ is given to the output terminal 5. This is because, when the write voltage VPP (>VCC) is given to the power source terminal 3, the output voltage VDD of the power source circuit 6a may increase and accordingly the reference voltages Va, Vb, and Vc may increase correspondingly. Thus, it is preferable to increase the voltage applied to the output terminal 5 so that the above-described "1" state can be surely maintained. After finishing the data writing to the memory 9b (i.e. after finishing shipment of the sensor product), the sensor can be used in the memory mode of the ordinary operation state.

Figure 6:
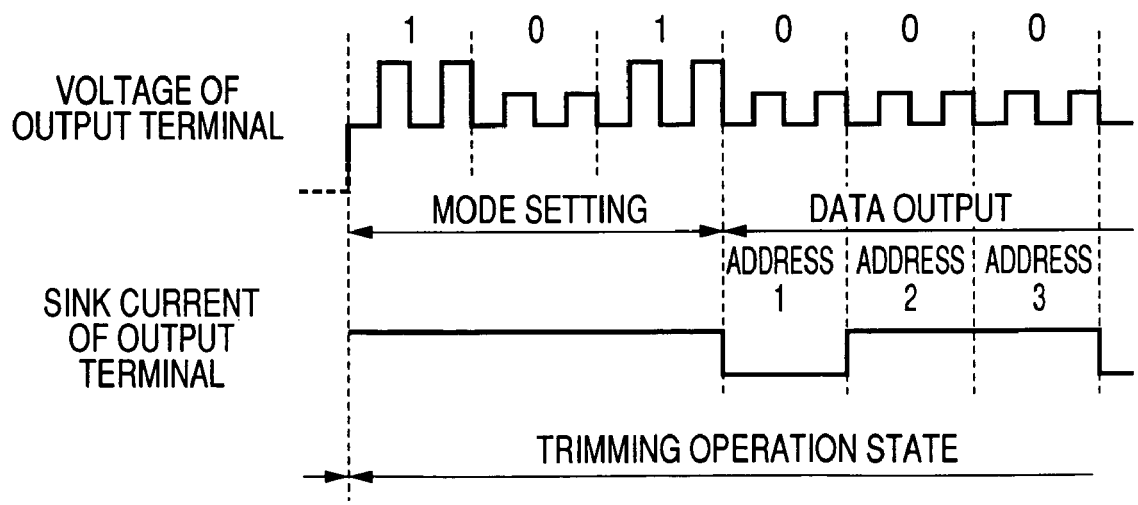
FIG. 6 is a diagram showing a waveform of the voltage applied to the output terminal during a read mode of the trimming operation state together with a waveform of the sink current of the output terminal.

Meanwhile, the printing data held by the latch 9a or the thing data stored in the memory 9b can be read out during the trimming process. FIG. 6 shows a waveform of the voltage applied to the output terminal 5 in the read mode together with a waveform of the sink current of output terminal 5. As shown in FIG. 6, a mode data "101" of the read mode is first given to the output terminal 5 from the trimming signal source 28. Then, a sync data "000 - - - " is given to the output terminal 5. In response to this sync data, the sink current at output terminal 5 changes in accordance with a value ("0" or "1") of the data stored in a predetermined address. This current is measured by the ammeter 27 of the external circuit 23. Thus, the above-described data is readable, In the case of reading the data held by the latch 9a instead of the data stored in the memory 9b, the mode data should be changed to a predetermined data. Owing to the fact that trimming data stored in the latch 9a or memory 9b can be read out in this way, it is possible to test how those trimming data are produced and stored in those memory means during the trimming process, which is effective for producing more precise and accurate trimming data. Incidentally this testing structure may not be limited to use in the sensor explained in the present embodiment, but be applicable to ally type of physical quantity sensors, such as pressure, acceleration, and temperature sensors, as long as the trimming circuit is required in those sensors.

As explained above, the sensor circuit 1 of this embodiment includes a built-in trimming circuit using a trimming value. Manufacturing differences appearing in the sensor output can be reduced. And, high accurate sensor output signals (detection signals) can be obtained, Furthermore, the sensor circuit 1 inputs the trimming data from the output terminal 5 and inputs the write voltage VPP from the power source terminal 3. Thus, no special or dedicated trimming terminal is required. The sensor circuit 1 can be minimized. The manufacturing costs can be reduced.

To transfer the operation state of sensor circuit 1 from the ordinary operation state to the trimming operation state, a voltage applied to the output terminal 5 must be higher than the power source voltage VCC to be applied in the ordinary operation state. This effectively prevents the sensor from erroneously transferring into the trimming operation state in a practical usage after the shipment of the sensor product. Furthermore, the reference voltage Va used in judging the transition into the trimming operation state is set to be higher than the power source voltage VCC with a predetermined margin. This setting can effectively prevent the sensor circuit 1 from erroneously transferring into the trimming operation state even when external noises are entered into the output terminal 5.

The trimming data entered from the output terminal 5 is temporarily held by the latch 9a. Accordingly, the analog circuit 6 can output a sensor detection signal having been trimmed based on the trimming data stored in the memory 9b (i.e. in the memory mode) and also can output a sensor detection signal having been trimmed based on the trimming data held by the latch 9a (i.e. in the latch mode). Therefore, in the trimming process, before the trimming data is finally written into the memory 9b, the trimming operation can be performed through the sequential processing of "input of trimming data→ measurement/confirmation of sensor output→ re-input of trimming data" without requiring any data writing into the memory 9b. The time required for the trimming processing can be shortened.

However, the sensor circuit 1 goes into the ordinary operation state of the latch mode only when a voltage applied to the output terminal 5 is higher than the power source voltage VCC to be applied to the power source terminal 3 in the ordinary operation state and further a value 1 is set to the additive bit succeeding the mode data and the trimming data given to the output terminal 5. This effectively prevents the sensor circuit 1 from erroneously transferring from the memory mode to the latch mode in a practical usage after finishing the shipment of the sensor product.

Furthermore, when the read mode is set in the trimming operation state, the trimming data held by the latch 9a or the trimming data stored in the memory 9b can be read out as the sink current of the output terminal 5. Thus, it becomes possible to easily confirm the trimming data being currently set.

As apparent from the foregoing description, the first embodiment of the present invention provides a first sensor including a sensor signal processing circuit (i.e. analog circuit 6), a data separation circuit (i.e. control signal separation circuit 7), and trimming value control circuit (i.e. trimming voltage controlling circuit 9). The sensor signal processing circuit of the first sensor has a power source terminal and an output terminal, for performing at least one of adjustment of a voltage supplied to a sensing element and adjustment of an output signal of the sensing element by using a trimming value, and outputs a detection signal representing the output signal of the sensing element from the output terminal. The data separation circuit of the first sensor produces a transfer signal instructing transition to a trimming operation state and separates data from a voltage signal entered into the output terminal, based on a comparison between a voltage entered into the output terminal and a predetermined reference voltage which is set beforehand to be a value within a voltage range higher than a power source voltage applied to the power source terminal in an ordinary operation state. The trimming value control circuit of the first sensor includes a holding circuit (i.e. latch 9a) and a memory. The holding circuit temporarily holds trimming data corresponding to a trimming value determining an adjustment amount for the adjustment performed by the sensor signal processing circuit among the data separated by the data separation circuit. The memory stores trimming data held by the holding circuit. The trimming value control circuit writes trimming data held in the holding circuit into the memory by using a write voltage given to the power source terminal. The trimming value control circuit selects either the trimming data held by the holding circuit or the trimming data stored in the memory in the ordinary operation. Furthermore, the trimming value control circuit produces a trimming value corresponding to a selected trimming data and sends the trimming value to the sensor signal processing circuit.

Furthermore, according to the first embodiment of the present invention, the data separation circuit produces an operation state signal Sr identifying a present operation state between the ordinary operation state and the trimming operation state, based on a comparison between the voltage Vin entered into the output terminal and a first reference voltage Va. The data separation circuit produces a clock signal Sc based on a comparison between the voltage Vin entered into the output terminal and a second reference voltage Vb being set to be higher than the first reference voltage Va. And, the data separation circuit separates a data signal Sd based on a comparison between the voltage Vin entered into the output terminal 5 and a third reference voltage Vc being set to be higher than the second reference voltage Yb.

Furthermore, according to the first embodiment of the present invention, the data separated by the data separation circuit includes a mode setting data, and the sensor signal processing circuit (i.e. analog circuit 6) outputs the trimming data held by the holding circuit (i.e. latch 9a) or the trimming data stored in the memory from the output terminal when the mode setting data in the trimming operation state is a read operation mode.

The trimming value control circuit selects either the trimming data held by the holding circuit or the trimming data stored in the memory based on a data pattern contained in a data stream separated by the data separation circuit in response to a transition of the sensor from the trimming operation state to the ordinary operation state, and produces a trimming value corresponding to a selected trimming data and outputs the trimming value to the sensor signal processing circuit.

The trimming value control circuit writes the trimming data held by the holding circuit into the memory when the mode setting data in the trimming operation state is the write operation mode.

Second Embodiment

Figure 7:
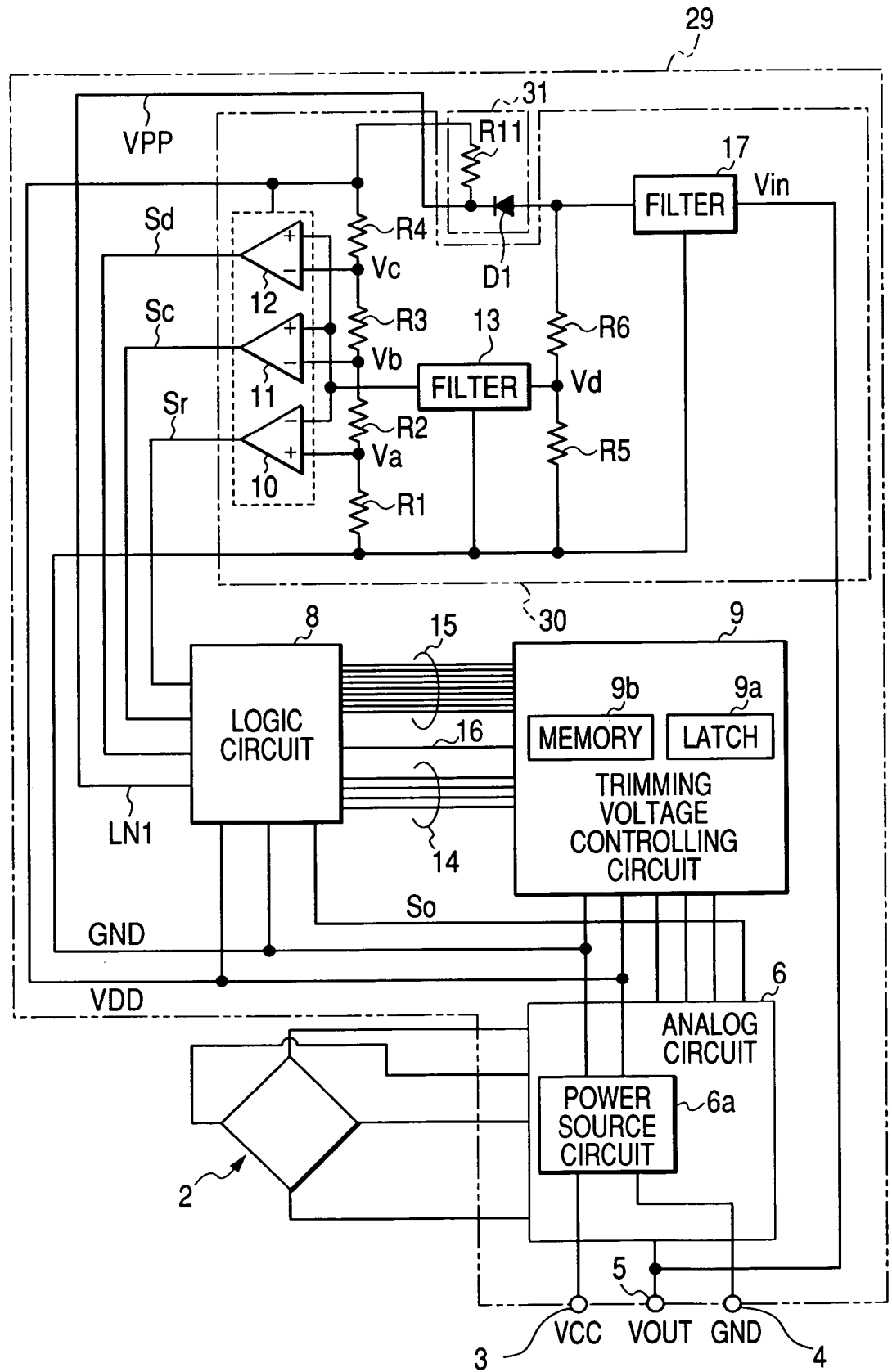
FIG. 7 is a circuit diagram showing an electric arrangement of a sensor circuit in accordance with a second embodiment of the present invention.

Next, a second embodiment of the present invention will be explained with reference to FIG. 7. FIG. 7 shows an electric arrangement of a CMOS sensor incorporating a trimming circuit. The portions and components identical with those shown in FIG. 1 are denoted by the same reference numerals. A sensor circuit 29 of the second embodiment is arranged to give both the trimming data and the write voltage VPP of the memory 9b from the output terminal 5 in the trimming operation state. The rest of the trimming procedure is substantially identical with that of the sensor circuit 1 explained in the first embodiment.

In a control signal separation circuit 30 (corresponding to the data separation circuit), the output terminal 5 is connected via the filter 17 to the serial circuit of resistors R5 and R6. Furthermore, a joint of the filter 17 aid the resistor R6 is connected via a switching circuit 31 (corresponding to a write voltage switching circuit) to the output line of the power source circuit 6a (i.e. a supply line of constant voltage VDD). The switching circuit 31 consists of a serial circuit of a diode D1 (having the polarity shown in the drawing) and a resistor R11. A joint of the diode D1 and the resistor R11 is connected to the write voltage supply line LN1.

The switching circuit 31 selects a higher voltage between the constant voltage VDD supplied from the power source circuit 6a and the voltage of the output terminal 5, and outputs the selected voltage to the write voltage supply line LN1. In the ordinary operation state, the voltage of output terminal 5 changes depending on the sensor output within a range from 0 V to VCC. When the voltage VCC is equal to the constant voltage VDD and a forward voltage Vf of diode D1 is taken into consideration, the diode D1 is always in an OFF state and accordingly the constant voltage VDD of the power source circuit 6a is given to the write voltage supply line LN1.

On the other hand, the voltage of output terminal 5 exceeds the voltage VCC in the trimming operation state (refer to FIG. 3A) aid accordingly the diode D1 is in an ON state. Hence, the voltage of output terminal 5 is given to the write voltage supply line LN1. The write voltage VPP entered from the output terminal 5 is given to the memory 9b when data is written into the memory 9b. In this embodiment, the resistor R11 has a function of preventing the constant voltage VDD of the power source circuit 6a from interfering with the voltage of output terminal 5.

Providing the switching circuit 31 as described above brings the effect of surely preventing a low voltage, if entered from the output terminal 5, from being applied to the substrate potential of the logic circuit 8 having a P-channel MOS structure via the write voltage supply line LN1 in the ordinary operation state. Accordingly, in addition to the functions and effects of the sensor circuit 1 described in the first embodiment, the sensor circuit 29 of the second embodiment can give both the trimming data and the write voltage VPP from the output terminal 5 even in a CMOS sensor.

In short, according to this embodiment, the sensor includes a power source circuit and a write voltage switching circuit (i.e. switching circuit 31). The power source circuit of this embodiment produces a constant voltage VDD from the voltage VCC given to the power source terminal. The write voltage switching circuit selects a higher voltage between the constant voltage VDD of the power source circuit and the voltage Vin entered into the output terminal, and outputs a selected voltage VPP to a write voltage supply line LN1 of the memory. The trimming value control circuit (i.e. trimming voltage controlling circuit 9) writes the trimming data held by the holding circuit (i.e. latch 9a) into the memory by using a write voltage given to the output terminal instead of using the voltage given to the power source terminal.

Third Embodiment

Figure 8:
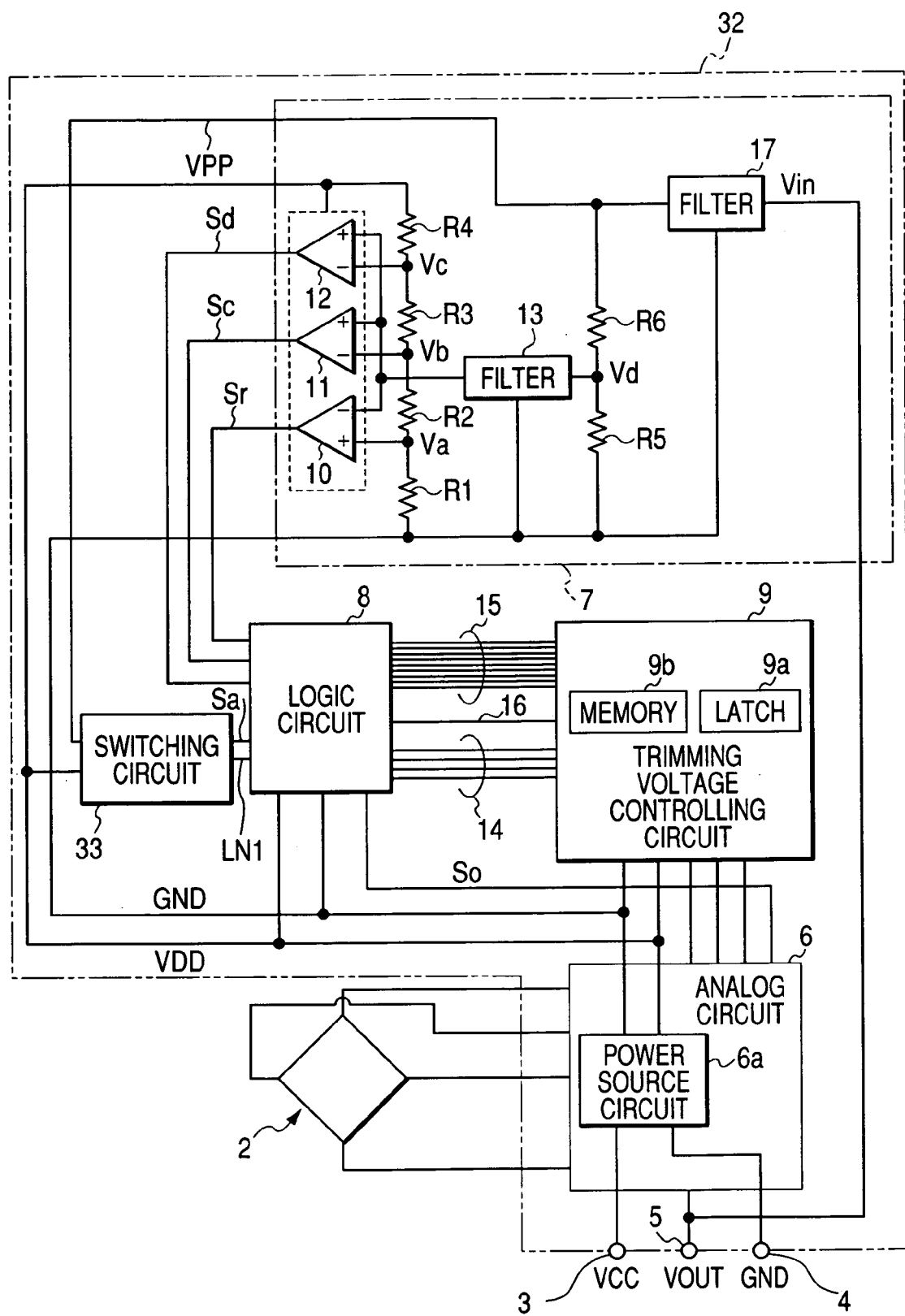
FIG. 8 is a circuit diagram showing an electric arrangement of a sensor circuit in accordance with a third embodiment of the present invention.

Next, a third embodiment of the present invention will be explained with reference to FIGS. 8 and 9. FIG. 8 shows an electric arrangement of a CMOS sensor incorporating a trimming circuit. The portions and components identical with those shown in FIG. 1 are denoted by the same reference numerals. A sensor circuit 32 of the third embodiment is arranged to give both the trimming data and the write voltage VPP from the output terminal 5 in the trimming operation state, like the sensor circuit 29 explained in the second embodiment. The sensor circuit 32 of the third embodiment, in order to prevent inversion of the substrate potential of the above-described logic circuit 8, includes a switching circuit 33 (corresponding to the write voltage switching circuit) that selects a higher voltage between the constant voltage VDD supplied from the power source circuit 6a and the voltage of output terminal 5 having passed the filter 17 and outputs the selected voltage to the write voltage supply line LN1.

Figure 9:
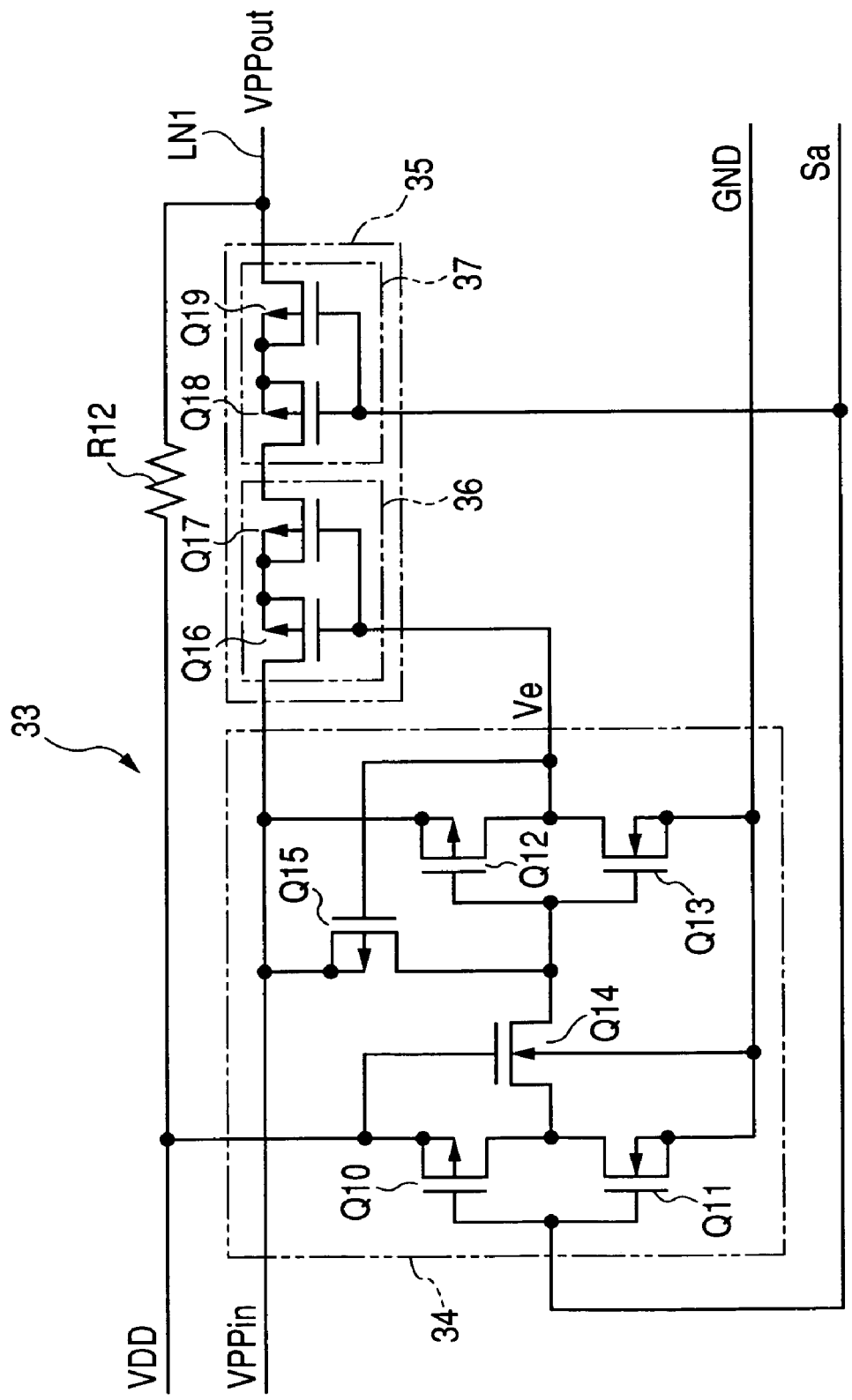
FIG. 9 is a circuit diagram showing a switching circuit in accordance with the third embodiment of the present invention.

FIG. 9 shows a detailed circuit arrangement of the switching circuit 33. One of two input voltages entered into the switching circuit 33 is a voltage VPPin supplied from the output terminal 5. The switching circuit 33 outputs a voltage VPPout (i.e. the voltage of write voltage supply line LN1). In the switching circuit 33, a switch circuit 35 intervenes between the input terminal of voltage VPPin and the output terminal of voltage VPPout (i.e. the write voltage supply line LN1), The logic circuit 8 outputs the control signal 5a to control the switch circuit 35 via a level converting circuit 34. A resistor R12 is connected between the input terminal of voltage VDD and the output terminal of voltage VPPout.

The level converting circuit 34 consists of six transistors Q10 to Q15. The switch circuit 35 includes a serial circuit of two switch circuits 35 and 36. The switch 36 consists of two transistors Q16 and Q17. The switch 37 consists of two transistors Q18 and Q19. More specifically, in the level converting circuit 34, two transistors Q10 and Q11 are serially connected between the input terminal of voltage VDD and the ground line. The transistors Q10 and Q11 are commonly connected at their gates. Furthermore, two transistors Q12 and Q13 are serially connected between the input terminal of voltage VPPin and the ground line. The transistors Q12 and Q13 are commonly connected at their gates.

The control signal 5a is given to respective gates of transistors Q10, Q11, Q18, and Q19. The transistors Q12 and Q13 have drains commonly connected to the gates of transistors Q16 and Q17. The transistor Q14 is connected between the drains of transistors Q10 and Q11 and the gates of transistors Q12 and Q13. The transistor Q15 is connected between the input terminal of voltage VPPin and the gates of transistors Q12 and Q13. The transistor Q14 has a gate connected to the input terminal of voltage VDD. The transistor Q15 has a gate connected to the drains of transistors Q12 and Q13.

In the ordinary operation state as well as in a non-write mode of the trimming operation state, the logic circuit 8 outputs the control signal Sa having an electric potential of voltage VDD. In this case, the transistors Q11, Q12, and Q14 turn on and the transistors Q10, Q13, and Q15 turn off. The drains of transistors Q12 and Q13 have an electric potential of voltage VPPin. As a result, the switch 36 is opened (i.e. OFF) under the condition VPPin>VDD and the switch 37 is opened (i.e. OFF) under the condition VPPin<VDD. Thus, the switch circuit 35 is kept in an OFF state and accordingly the switching circuit 33 outputs the voltage VDD.

On the other hand, in the memory write mode of the trimming operation state, the logic circuit 8 outputs the control signal Sa having an electric potential of voltage 0 V. In this case, the transistors Q11 and Q12 turn off and the transistors Q10, Q13, Q14, and Q15 turn on. The drains of transistors Q12 and Q13 have an electric potential of voltage 0 V. As a result, the switches 36 and 37 are closed (i.e. ON). The switch circuit 35 is kept in an ON state and accordingly the switching circuit 33 outputs the write voltage VPPin (=VPP).

Providing the switching circuit 33 in this manner brings the effect of surely preventing a low voltage, if entered from the output terminal 5, from being applied to the substrate potential of the logic circuit 8 via die write voltage supply line LN1 in the ordinary operation state, like the switching circuit 31 disclosed in the second embodiment. Accordingly, in addition to the functions and effects of the sensor circuit 1 described in the first embodiment, the sensor circuit 32 of the third embodiment can give both the trimming data and the write voltage VPP from the output terminal 5 even in a CMOS sensor.

Fourth Embodiment

Figure 10:
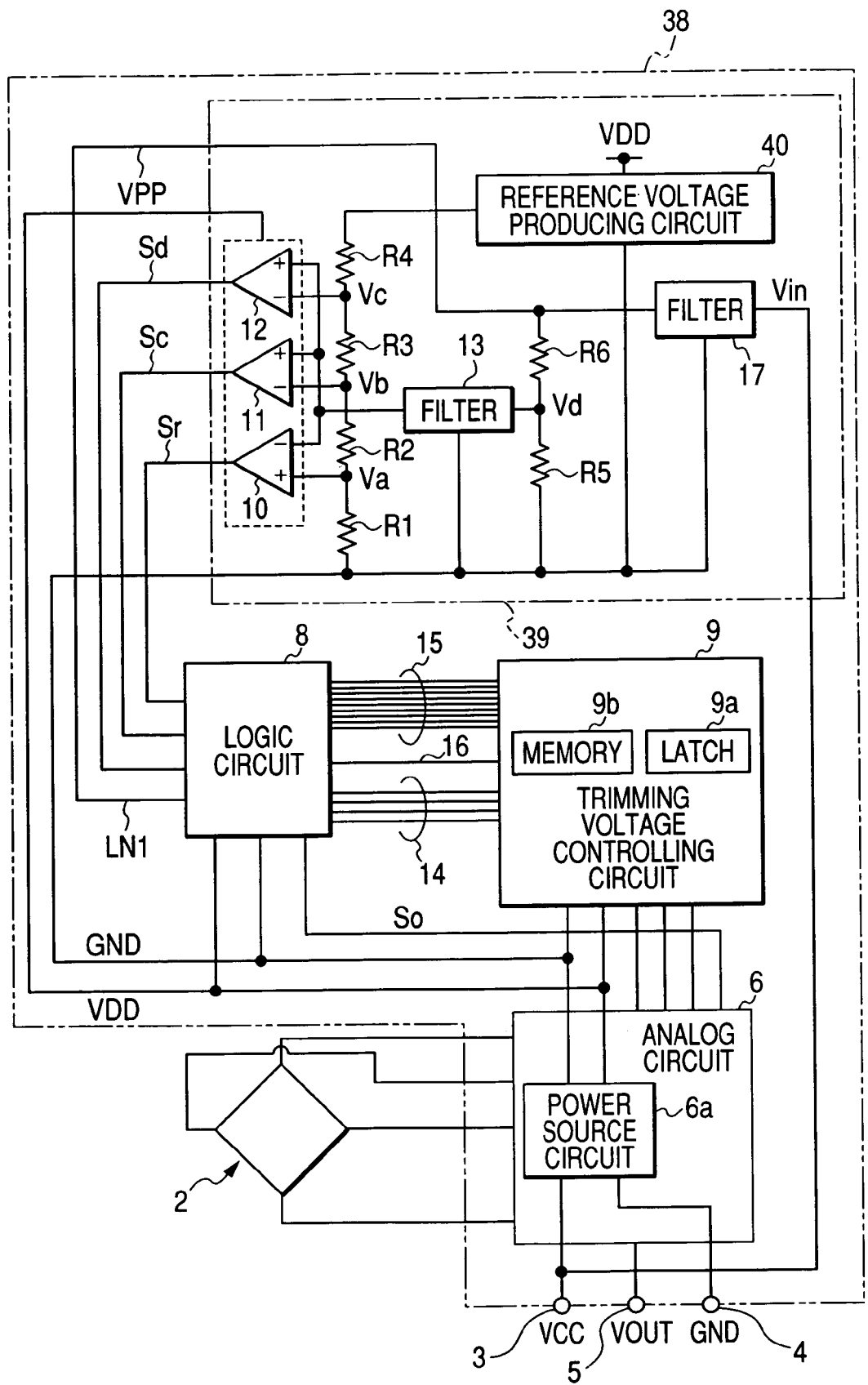
FIG. 10 is a circuit diagram showing an electric arrangement of a sensor circuit in accordance with a fourth embodiment of the present invention.

Next, a fourth embodiment of the present invention will be explained with reference to FIG. 10, FIG. 10 shows an electric arrangement of a CMOS sensor incorporating a trimming circuit. The portions and components identical with those shown in FIG. 1 are denoted by the same reference numerals. A sensor circuit 38 of the fourth embodiment is arranged to give both the trimming data and the write voltage VPP of memory 9b from the power source terminal 3 in the trimming operation state. The rest of the trimming procedure is substantially identical with that of the sensor circuit 1 explained in the first embodiment.

In a control signal separation circuit 39 (corresponding to the data separation circuit), the power source terminal 3 is connected via the filter 17 to the serial circuit of resistors R6 and R5 and further to the write voltage supply line LN1. Furthermore, the control signal separation circuit 39 includes a reference voltage producing circuit 40 that produces a constant reference voltage based on the power source voltage VDD. This reference voltage is given to a serial circuit consisting of four resistors R1 to R4.

According to this embodiment, only two power source terminals 3 and 4 are used to perform the trimming operation. For example, this embodiment enables a magnetic sensor or any other two-line sensor of current output type, which have no output terminal, to perform the trimming operation. Furthermore, providing the reference voltage producing circuit 40 brings the effect of stably providing the reference voltages Va, Vb, and Vc even when the write voltage VPP is applied to the power source terminal 3. Thus, this embodiment can realize a stable trimming operation without causing any malfunctions.

As apparent from the foregoing description, the fourth embodiment of the present invention provides a second sensor, including a sensor signal processing circuit (i.e. analog circuit 6), a data separation circuit (i.e. control signal separation circuit 7), and a trimming value control circuit (i.e. trimming voltage controlling circuit 9). The sensor signal processing circuit of the second sensor has a power source terminal 3 and performs at least one of adjustment of a voltage supplied to a sensing element and adjustment of an output signal of the sensing element by using a trimming value, and outputs a detection signal representing the output signal of the sensing element from the power source terminal. The data separation circuit of the second sensor produces a transfer signal instructing transition to a trimming operation state and separating data from a voltage signal entered into the power source terminal, based on a comparison between a voltage entered into the power source terminal and a predetermined reference voltage which is set beforehand to be a value within a voltage range higher than the power source voltage applied to the power source terminal in an ordinary operation state. The trimming value control circuit of the second sensor includes a holding circuit (i.e. latch 9a) and a memory. The holding circuit temporarily holds trimming data corresponding to a trimming value determining an adjustment amount for the adjustment performed by the sensor signal processing circuit among the data separated by the data separation circuit. The memory stores trimming data held by the holding circuit. The thinning value control circuit writes trimming data held in the holding circuit into the memory by using a write voltage given to the power source terminal. The trimming value control circuit selects either the trimming data held by the holding circuit or the trimming data stored in the memory in the ordinary operation. And, the trimming value control circuit further produces a trimming value corresponding to a selected trimming data and sends the trimming value to the sensor signal processing circuit.

Modifications

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims. The sensor of the present invention can be modified in the following manner.

For example, the trimming voltage controlling circuit 9 can be arranged to prohibit the sensor from transferring into the latch mode in the ordinary operation state by writing the trimming data held by the latch 9a into the memory 9b.

According to the above-described first embodiment, it is possible to prohibit transition to the latch mode by writing the additive bit into a specific address N+1 of the memory 9b. This can surely prevent the sensor from transferring into the latch mode even when the power source voltage changes or when external noises enter during the ordinary operation after finishing the shipment of the sensor product. Thus, it becomes possible to surely prevent the trimming data held by the latch 9a from being erroneously selected. The noise durability against EMC, ESD, etc can be improved.

The sensing element 2 of the present invention can be selected from various physical quantity sensors, such as pressure sensors, acceleration sensors, and magnetic sensors. The memory of the present invention is not limited to EPROM and accordingly any other nonvolatile memory can be used as long as the data is electrically written into the memory. It is also possible to arrange the trimming data held by the latch 9a or the trimming data stored in the memory 9b so as to be read out as a voltage signal from the output terminal 5 in the read mode.

Moreover, a computer system using a CPU (central processing unit) working on a software basis can also be applied to the circuitry components shown in FIGS. 1, 7, 8, 10, respectively. For example, it preferred that the circuits 8, 9 and 6 are formed by the computer system.

What is claimed is:

1. A sensor with a sensing element sensing a physical quantity, comprising
trimming means for using a trimming value to adjust at least one of a voltage to be supplied to the sensing element and a signal from the sensing element;
storing means storing trimming data indicative of the trimming value, the trimming data being given as desired data from outside the sensor; and
testing means for reading out the trimming data from the storing means to test how the trimming data are actually produced and stored in the storing means.

2. The sensor in accordance with claim 1, wherein the testing means is configured to read the trimming data in a form of sink current at a predetermined terminal correcting both an inside and an outside of the sensor and communicating with the storing means.

3. The sensor in accordance with claim 2, wherein the predetermined terminal is an output terminal through which the signal from the sensing element is outputted outside the sensor.

4. The sensor in accordance with claim 3, wherein the output terminal composes part of terminals electrically connecting both the inside and the outside of the sensor, a power source terminal composing the rest of the terminals.

5. A sensor, comprising
a sensor signal processing circuit having a power source terminal and all output terminal for performing at least one of adjustment of a voltage supplied to a sensing element and adjustment of an output signal of said sensing element by using a trimming value and for outputting a detection signal representing the output signal of said sensing element front said output terminal;
a data separation circuit for producing a transfer signal instructing transition to a trimming operation state and separating data from a voltage signal entered into said output terminal, based on a comparison between a voltage entered into said output terminal and a predetermined reference voltage which is set beforehand to be a value within a voltage range higher than a power source voltage applied to said power source terminal in an ordinary operation state; and a trimming value control circuit including a holding circuit for temporarily holding trimming data corresponding to a trimming value determining an adjustment amount for the adjustment performed by said sensor signal processing circuit among the data separated by said data separation circuit and a memory for storing trimming data held by said holding circuit, wherein said trimming value control circuit writes trimming data held in said holding circuit into said memory by using a write voltage given to said power source terminal, and selects either the trimming data held by said holding circuit or the trimming data stored in said memory in said ordinary operation, and further produces a trimming value corresponding to a selected trimming data and sends said trimming value to said sensor signal processing circuit.

6. The sensor in accordance with claim 1, wherein said data separation circuit produces an operation state signal identifying a present operation state between said ordinary operation state and said trimming operation state, based on a comparison between the voltage entered into said output terminal and a first reference voltage, produces a clock signal based on a comparison between the voltage entered into said output terminal and a second reference voltage being set to be higher than said first reference voltage, and separates a data signal based on a comparison between the voltage entered into said output terminal and a third reference voltage being set to be higher than said second reference voltage.

7. The sensor in accordance with claim 1, flier comprising a power source circuit which produces a constant voltage from the voltage given to said power source terminal, and a write voltage switching circuit which selects a higher voltage between said constant voltage of the power source circuit and the voltage entered into said output terminal and outputs a selected voltage to a write voltage supply line of said memory, wherein said trimming value control circuit writes the trimming data held by said holding circuit into said memory by using a write voltage given to said output terminal instead of using the voltage given to said power source terminal.

8. The sensor in accordance with claim 1, wherein the data separated by said data separation circuit includes a mode setting data, and said sensor signal processing circuit outputs the trimming data held by said holding circuit or the trimming data stored in said memory from said output terminal when said mode setting data in said trimming operation state is a read operation mode.

9. The sensor in accordance with claim 1, wherein said trimming value control circuit selects either the trimming data held by said holding circuit or the trimming data stored in said memory based on a data pattern contained in a data stream separated by said data separation circuit in response to a transition of the sensor from said trimming operation state to said ordinary operation state, and produces a trimming value corresponding to a selected trimming data and outputs the trimming value to said sensor signal processing circuit.

10. The sensor in accordance with claim 1, wherein the data separated by said data separation circuit includes a mode setting data, and said trimming value control circuit writes the trimming data held by said holding circuit into said memory when said mode setting data in said trimming operation state is a write operation mode.

11. The sensor in accordance with claim 1, wherein said trimming value control circuit prohibits production of the trimming value based on trimming data held by said holding circuit after the trimming data held by said holding circuit is written in said memory.

12. The sensor in accordance with claim 1, further comprising
testing means for reading out the trimming data either held by the holding circuit or memorized in the memory to test how the trimming data are actually produced.

13. A sensor, comprising:
a sensor signal processing circuit having a power source terminal for performing at least one of adjustment of a voltage supplied to a sensing element and adjustment of an output signal of said sensing element by using a trimming value and for outputting a detection signal representing the output signal of said sensing element from said power source terminal;

a data separation circuit for producing a transfer signal instructing transition to a trimming operation state and separating data from a voltage signal entered into said power source terminal, based on a comparison between a voltage entered into said power source terminal and a predetermined reference voltage which is set beforehand to be a value within a voltage range higher than the power source voltage applied to said power source terminal in an ordinary operation state;

a trimming value control circuit including a holding circuit for temporarily holding trimming data corresponding to a trimming value determining an adjustment amount for the adjustment performed by said sensor signal processing circuit among the data separated by said data separation circuit and a memory for storing trimming data held by said holding circuit, wherein said trimming value control circuit writes trimming data held in said holding circuit into said memory by using a write voltage given to said power source terminal, selects either the trimming data held by said holding circuit or the trimming data stored in said memory in said ordinary operation, and further produces a trimming value corresponding to a selected trimming data and sends said trimming value to said sensor signal processing circuit.

14. The sensor in accordance with claim 13, wherein said data separation circuit produces an operation state signal identifying a present operation state between said ordinary operation state and said trimming operation state, based on a comparison between the voltage entered into said power source terminal and a first reference voltage, produces a clock signal based on a comparison between the voltage entered into said power source terminal and a second reference voltage being set to be higher than said first reference voltage, and separates a data signal based on a comparison between the voltage entered into said power source terminal and a third reference voltage being set to be higher than said second reference voltage.

15. The sensor in accordance with claim 13, wherein the data separated by said data separation circuit includes a mode setting data, and said sensor signal processing circuit outputs the trimming data held by said holding circuit or the trimming data stored in said memory from said power source terminal when said mode setting data in said trimming operation state is the read operation mode.

16. The sensor in accordance with claim 13, wherein said trimming value control circuit selects either the trimming data held by said holding circuit or the trimming data stored in said memory based on a data pattern contained in a data stream separated by said data separation circuit in response to a transition of the sensor from said trimming operation state to said ordinary operation state, and produces a trimming value corresponding to a selected trimming data and outputs the trimming value to said sensor signal processing circuit.

17. The sensor in accordance with claim 13, wherein the data separated by said data separation circuit includes a mode setting data, and said trimming value control circuit writes the trimming data held by said holding circuit into said memory when said mode setting data in said trimming operation state is a write operation mode.

18. The sensor in accordance with claim 13, wherein said trimming value control circuit prohibits production of the trimming value based on trimming data held by said holding circuit after the trimming data held by said holding circuit is written in said memory.

19. The sensor in accordance with claim 13, further comprising testing means for reading out the trimming data either held by the holding circuit or memorized in the memory to test how the trimming data are actually produced.

20. A unit for driving a sensing element outputting a signal in response to a physical value to be detected in an ordinal operation state thereof, comprising:

terminals electrically connecting both an inside and an outside of the unit and consisting of a power source terminal and an output terminal, the power source terminal receiving a power voltage supplied to the sensing element in the ordinal operation and the output terminal being used to output a detection signal depending on an output signal of the sensing element;

performing means for using a trimming value to adjust at least one of a voltage to be supplied to the sensing element and the signal from the sensing element;

outputting means for outputting the detection signal through the output terminal;

comparing means for comparing a voltage entered to the output terminal and a predetermined reference voltage which is set beforehand within a voltage range higher than the power source voltage applied to the power source terminal in the ordinary operation state;

transferring means for making the unit transfer into a trimming operation state, on the basis a compared result performed by the comparing means;

separating means for separating data from the voltage signal entered to the output terminal in response to the transfer to the trimming operation state, the data including trimming data corresponding to a trimming value determining an adjustment amount for the adjustment performed by the adjusting metals;

holding means for temporarily holding the trimming data;

a memory capable of memorizing the trimming data;

writing means for the trimming data held in the holding means into the memory responsively 10 a write voltage given to the power source terminal;

selecting means for selecting either the trimming data held by the holding means or the trimming data stored in the memory in the ordinary operation state;

and producing means for producing the trimming value corresponding to the trimming data by the selecting means, the trimming data being provided to the performing means.

21. The unit in accordance with claim 16, further comprising testing means for reading out the trimming data either held by the holding circuit or memorized in the memory to test how the trimming data are actually produced.

22. A unit for driving a sensing element outputting a signal in response to a physical value to be detected in an ordinal operation state is thereof, comprising:

a terminal electrically connecting both an inside and an outside of the unit and consisting of a power source terminal receiving a power voltage supplied to the sensing element in the ordinal operation;

performing means for using a trimming value to adjust at least one of a voltage to be supplied to the sensing element and the signal from the sensing element;

outputting means for outputting the detection signal through the power source terminal;

comparing means for comparing a voltage entered to the power source terminal and a predetermined reference voltage which is set beforehand within a voltage range higher than the power source voltage applied to the power source terminal in the ordinary operation state;

transferring means for making the unit transfer into a trimming operation state, on the basis a compared result performed by the comparing means;

separating means for separating data from the voltage signal entered to the power source terminal in response to the transfer to the trimming operation state, the data including trimming data corresponding to a trimming value determining an adjustment amount for the adjustment performed by the adjusting means;

holding means for temporarily holding the trimming data;

a memory capable of memorizing the trimming data;

writing means for the trimming data held in the holding means into the memory responsively to a write voltage given to the power source terminal;

selecting means for selecting either the trimming data held by the holding means or the trimming data stored in the memory in the ordinary operation state;

and producing means for producing the trimming value corresponding to the trimming data by the selecting means, the trimming data being provided to the performing means.

23. The unit in accordance with claim 22, further comprising testing means for reading out the trimming data either held by the holding circuit or memorized in the memory to test how the trimming data are actually produced.

* * * * *